United States Patent Office 3,329,016
Patented July 4, 1967

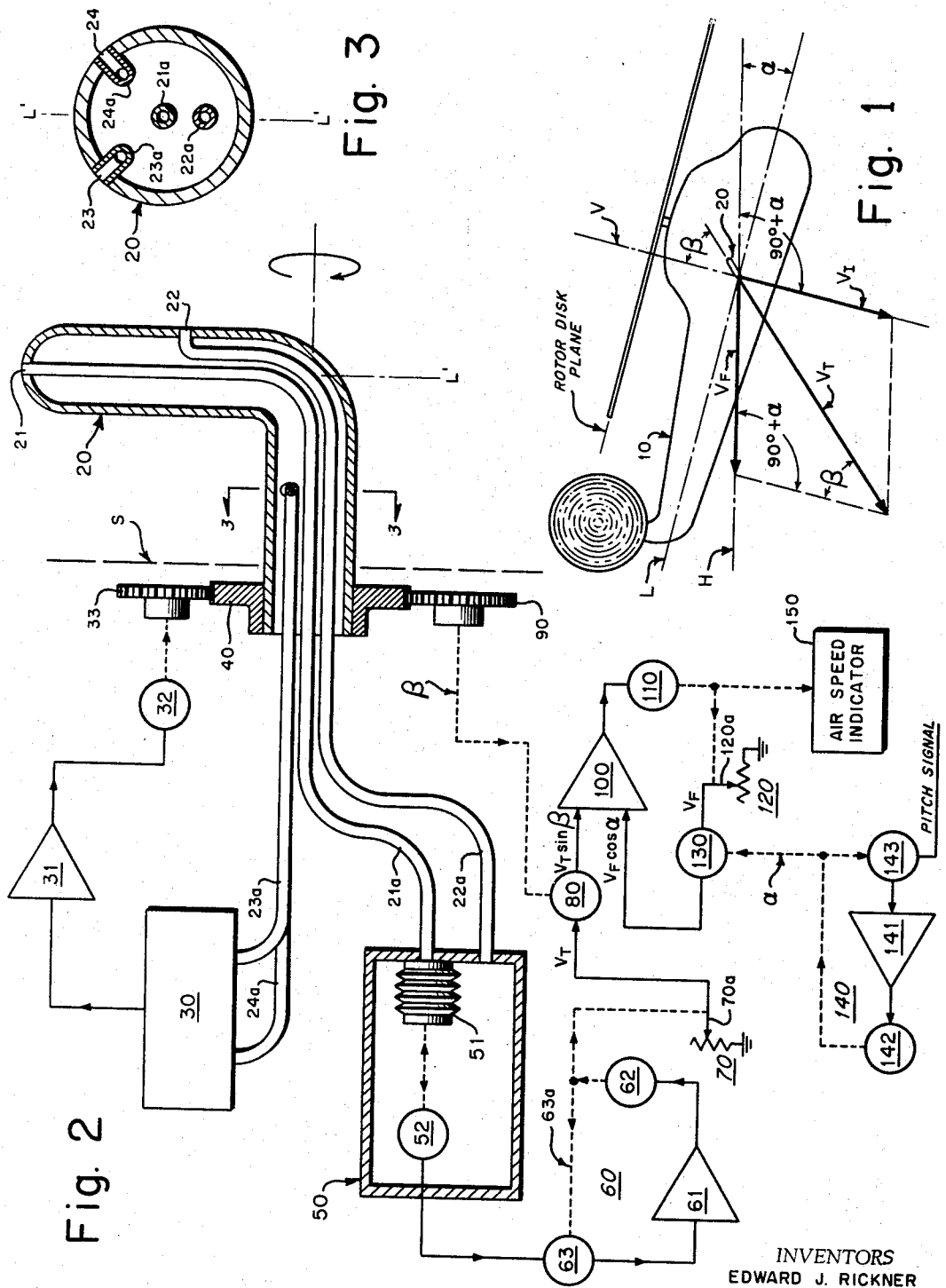

---

3,329,016
HELICOPTER AIRSPEED MEASURING SYSTEM
Joseph L. Leavens, Warminster, and Edward J. Rickner, Hartsville, Pa., assignors to the United States of America as represented by the Secretary of the Navy
Filed Oct. 22, 1965, Ser. No. 502,741
12 Claims. (Cl. 73—182)

ABSTRACT OF THE DISCLOSURE

Helicopter air speed measuring apparatus having a pitot-static probe mounted rotatably on the side of the helicopter fuselage in the downwash from the helicopter rotor blades. The apparatus further includes a pressure responsive apparatus for positioning the probe so that it is aligned with the direction of the resultant air stream directed theretoward and computer apparatus responsive to the pitot static pressure differential, the rotational position of the probe and the pitch of the helicopter for providing an indication of the horizontal air speed of the helicopter in the forward direction.

DISCLOSURE

The invention described herein may be manufactured and used by or for the Government of the United States of America for governmental purposes without the payment of any royalties thereon or therefor.

The present invention relates to an airspeed measuring system and more particularly to an airspeed measuring system for rotary winged aircraft or the like.

Accurate airspeed information is required for functions such as flight control, navigation and weapons delivery. Conventional helicopter airspeed measuring systems consisted of pressure operated indicators or transducers that were connected to the aircraft pitot-static system. The pitot tube of the conventional system was rigidly connected to the helicopter and was directed forward along the fore and aft axis of the airframe. The static ports for the system were mounted flush with the airframe or on the side of the pitot tube assembly. The major disadvantage of this system was in its poor accuracy at low airspeeds due to the effect of rotor downwash on the pitot-static system.

Many new concepts have been devised to overcome the difficulties mentioned above. One such system is based on the measurement of the velocity of the rotor blade tip (which is always positive, relative to the air mass) relative to the air. Variation of the blade tip velocity, per revolution of the blade, is a function of the translational speed of the helicopter, among other things. By measurement of the phase and magnitude of the variation, the system computes the helicopter true air speed along the fore and aft axis and athwartship. Specifically, the helicopter airspeed measuring system employed pressure transducers that were mounted on the ends of rotor blades and a computer that computes airspeed from the signals supplied by these transducers and other signals representing factors such as static pressure, rotor speed and rotor blade position. Although this system provided improved accuracies at low speeds, it had two serious disadvantages: first, the location of the transducers at the ends of rotor blades and the requirement for signals representing rotor speed and blade position made the installing complex and costly. Secondly, extensive computations were required to convert the measuring quantities into usable airspeed information.

The present invention obviates the deleterious conditions indicated above and provides an improved helicopter airspeed measuring system which obtains increased accuracy over conventional pitot-static airspeed systems and lower cost and higher reliability than that of the blade tip sensor-type systems. These advantages of the invention are obtained in the present instance by the use of a rotatable pitot-static tube which senses both magnitude and direction of the airstream and the use of this information together with aircraft pitch to compute airspeed.

It is an object of the present invention to provide an improved helicopter airspeed measuring system which provides accurate airspeed measurements particularly at low speeds.

Another object of the present invention is to provide an improved helicopter airspeed measuring system which obtains high accuracy at low airspeeds, such system being relatively simple and inexpensive and not requiring extensive computations.

Still another object of the present invention is to accurately measure the true airspeed of an airborne vehicle which has the capability of ascending or descending without translating, translating in any direction at extremely low speeds, or not moving at all, while at the same time being surrounded by a moving fluid generated by its own power.

Various other objects and advantages will appear from the following description of an embodiment of the invention, and the novel features will be particularly pointed out hereinafter in connection with the appended claims.

In the drawings:

FIG. 1 is a vector diagram illustrating the basic principal of the inventive system;

FIG. 2 is a schematic representation of the helicopter airspeed measuring system; and FIG. 3 is a cross sectional view taken along the line 3—3 of FIG. 2.

In the illustrated embodiment of the invention and with particular reference to FIG. 1 which illustrates the basic principle of the system in vector diagram format, a helicopter generally noted at 10 is illustrated as including a yaw axis V and a roll axis L normal thereto. A rotatable pitot-static tube generally noted at 20, is secured to the helicopter 10 and lies in a plane parallel to the aircraft's yaw axis V and the roll axis L.

A vector $V_T$, representing the velocity of the airstream in the vicinity of the pitot-static tube is the vector sum of both the velocity $V_F$ due to the forward motion, and the incident velocity $V_I$ due to the rotor, the latter velocity occurring at right angles to the rotor disc plane. An angle $\alpha$, the pitch angle of the aircraft (the angle between the horizontal plane or axis H and the roll axis L of the aircraft), may be measured by a vertical gyro that is normally a part of the aircraft's avionics system. The angle $\beta$ existing between the total velocity vector $V_T$ and the yaw axis V of the aircraft is determined by the angular position of the rotatable pitot-static tube 20 which is positioned into the airstream. In other words, angle $\beta$ is the angle existing between the direction of the airstream as determined by the position of the rotatable pitot-static tube and the yaw axis V of the aircraft.

A trigonometric solution of the vector diagram provides the following relationship:

$$V_F = \frac{V_T \sin \beta}{\cos \alpha}$$

where $V_F$ is the forward airspeed of the helicopter.

Referring now to FIG. 2 for a schematic representation of the mechanization of the system necessary to obtain an indication representative of the forward velocity $V_F$, it is seen that the pitot-static tube 20 is positioned adjacent the skin line S of the aircraft 10 by appropriate means not shown and is rotated into the direction of the total airstream by means to be described below.

Pitot-static tube 20 is generally of conventional configuration and includes a pitot port 21 and a static port 22. In addition to the above, and as viewed in FIG. 3, pitot-static tube 20 further includes a pair of correction ports 23 and 24, these correction ports 23 and 24 being each equally spaced from the longitudinal axis L' of the pitot-static tube 20 about the periphery thereof.

Tubes 23a and 24a connect the ports 23 and 24, respectively, to a differential pressure sensor 30 of the type known and used in the art. Differential pressure sensor 30 is interconnected with a servo amplifier 31 and provides an electrical output signal to the latter when the pressures on ports 23 and 24 are not equal. The output signal from the servo amplifier 31 is applied to a servo motor 32 which in turn drives gear 33. The direction of movement of gear 33 is dependent upon which of ports 23 or 24 is subjected to the higher pressure. The unbalance in pressure sensed through ports 23 and 24 causes the rotation of gear 33 which in turn rotates the pitot-static tube 20 due to the interconnection of the gear 33 with a pitot-static tube rotating mechanism or drive gear 40. The servo motor 32 through gears 33 and 40 rotate the tube 20 until the pressure on ports 23 and 24 are equal. This condition will occur only when the incidence angles between the port and the local airstream are equal, i.e., when the longitudinal axis L' of the pitot-static tube 20 is directed into the airstream.

The pitot port 21 and the static port 22 of the pitot-static tube 20 are connected to an airspeed transducer generally indicated at 50 through appropriate tubing 21a and 22a, respectively. The airspeed transducer 50 is a conventional airspeed mechanism for converting pitot-static pressure to a synchro type signal and consists of an airspeed capsule indicated at 51 that is mechanically linked to an appropriate electrical transducer 52 such as a synchro generator or the like. The electrical output from transducer 52 is applied to a conventional servo mechanism generally indicated at 60 which consists of a servo amplifier 61, a servo motor 62 and a synchro or control transformer 63.

As the rotor of the synchro generator 52 is turned by the airspeed capsule 51 to which it is connected, an error voltage is developed across the rotor terminals of the control transformer 63. The phase and magnitude of this error voltage indicate the differential pressure at ports 21 and 22. The error signal is amplified and applied to the servo motor 62, the motor turning in a direction and at a speed determined by the amplified error signal. As the motor 62 turns, both loads thereof, here the wiper arm 70a of potentiometer 70, and the rotor 63a of the control transformer 63, which are mechanically linked to it, turn also. When the load or wiper arm 70a is turned to the position which corresponds with that of the airspeed capsule, the rotor 63a of the control transformer 63 is in the position where it nulls the error signal. With no error signal, the servo motor stops turning and the positions of the airspeed capsule 51 and wiper arms 70a correspond. The servo mechanism 60 through its component servo motor 62 thereby positions the wiper 70a of the potentiometer 70 in accordance with the input signal received thereby from the airspeed transducer 50. The voltage output of the potentiometer 70 represents the total velocity $V_T$ and this voltage is applied to one winding of a resolver indicated at 80.

Pitot-static tube rotating mechanism 40, rotating pursuant to the rotation of gear 33, drives an output gear 90 which is mechanically coupled to the resolver 80 so that the sine winding thereof is positioned in accordance with the angular relationship of the pitot-static tube 20, which is the angle $\beta$ as seen in FIG. 1.

The output of resolver 80 which represents the quantity $V_T \sin \beta$ is summed with a signal representing $V_F \cos \alpha$, this latter signal being obtained as the output from resolver 130, to be discussed below. The resulting output voltage is amplified by servo amplifier 100 and the output thereof in turn is used to drive the servo motor 110.

The servo motor 110 positions the wiper arm 120a of the potentiometer 120, the wiper arm 120a picking off and providing an electrical signal representing the forward airspeed $V_F$ in the computing circuit for $V_F \cos \alpha$.

The function $\cos \alpha$ in this circuit is obtained by a resolver 130 which is positioned by means of a conventional servo mechanism generally indicated at 140 in accordance with a pitch signal obtained from a conventional aircraft vertical gyro. The servo mechanism 140 consists of a servo amplifier 141, a servo motor 142 and a synchro or control transformer 143.

The pitch signal from the vertical gyro, not shown, is fed to the control transformer 143 and an error voltage is developed the phase and magnitude of which indicates the amount and direction of the pitch of the aircraft. The error signal is amplified by servo amplifier 141 and applied to the servo motor 142. The motor 142 turns in a direction and at a speed which is determined by the amplified error signal. As the motor 142 turns, both the load, here the rotor of resolver 130, and the rotor of control transformer 143, which are mechanically linked to it, turn also. When the resolver 130 is turned to the position which nulls the error signal, the servo motor 142 stops turning and the cosine winding of the resolver 130 is positioned in accordance with angle $\alpha$, as indicated in FIG. 1. The output of the resolver 130 which represents the quantity $V_F \cos \alpha$ is applied to a servo amplifier 100.

In the computation of $V_F$, the servo motor 110 receives the output of servo amplifier 100 and positions the wiper 120a of potentiometer 120 until the voltage repersenting $$V_T \sin \beta \text{ equal } V_F \cos \alpha \ \left( \text{by transposition } V_F = \frac{V_T \sin \beta}{\cos \alpha} \right)$$

When this null position is reached, the position of the potentiometer wiper 120a represents the desired forward of velocity $V_F$. A direct indication is obtained by connecting a readout dial or airspeed indicator 150 to the servo-motor 110 as indicated in FIG. 2.

It is seen by the above that the present invention obtains increased accuracy over conventional pitot-static airspeed systems and lower cost and higher reliability than that of the blade tip sensor system.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:
1. An airspeed measuring system for a helicopter having a rotor and further including means therein for providing an output signal representative of the pitch angle of the helicopter with respect to a horizontal axis, comprising:

a pitot-static tube including static and pitot ports, said tube rotatably connected to the helicopter;

means for rotating said tube with respect to the yaw axis of the helicopter until said tube faces in the direction of the airstream;

means responsive to the rotation of said tube for providing an output representative of the angle between said tube and the yaw axis;

means connected to said static and pitot ports for measuring the total airstream velocity and providing an output signal representative thereof;

a first resolver means receiving both said signal representative of the total airstream velocity and said output representative of the angle between said tube and the yaw axis for providing an output indicative of the product of the total airstream velocity and the sine of the angle between said tube and the yaw axis;

adjustable means for producing an output signal;

second resolver means receiving said output signal from said adjustable means and the output signal representative of the pitch angle of the helicopter for producing an output indicative of the product of said output signal and the cosine of the pitch angle;

means for comparing said outputs indicative of products and adjusting said output signal of said adjustable means to equalize said products, whereby the output signal of the adjusting means is indicative of the forward velocity of the helicopter.

2. The system as defined in claim 1 wherein said means for rotating said tube with respect to the yaw axis includes:

a pair of correction ports formed in said tube, each port being equally spaced from the longitudinal axis of said tube about the periphery thereof;

differential pressure sensing means connected to said ports and providing an output signal indicative of the unbalance in pressures sensed by each of said ports;

means receiving said signal indicative of the unbalance for rotating said tube in a direction to eliminate the unbalance.

3. The system as defined in claim 2 wherein:

said means for rotating said tube includes a servo motor receiving said signal indicative of the unbalance, and gear means connected between said servo motor and said tube for rotating the latter in response to the unbalance signal.

4. The system as defined in claim 3 wherein said means responsive to the rotation of said tube for providing an output representative of the angle between said tube and the yaw axis includes a series of gear means.

5. The system as defined in claim 4 wherein said means for providing an output signal representative of the total airstream velocity includes:

an airspeed transducer means connected to said static and pitot ports for providing an output signal representative of the total airstream velocity;

a servo mechanism driven by said output signal from said airspeed transducer means;

potentiometer means including a wiper arm, said servo mechanism adjusting said wiper arm in response to the output signal from said airspeed transducer means, said potentiometer having an output indicative of the total airstream velocity.

6. The system as defined in claim 5 wherein said adjustable means for producing an output signal is a potentiometer.

7. The system as defined in claim 6 wherein said means for comparing said outputs indicative of said products is a differential amplifier.

8. The system as defined in claim 1 wherein said means for providing an output signal representative of the total airstream velocity includes:

an airspeed transducer means connected to said static and pitot ports for providing an output signal representative of the total airstream velocity;

a servo mechanism driven by said output signal from said airspeed transducer means;

potentiometer means including a wiper arm, said servo mechanism adjusting said wiper arm in response to the output signal from said airspeed transducer means, said potentiometer having an output indicative of the total airstream velocity.

9. The system as defined in claim 1 wherein said adjustable means for producing an output signal is a potentiometer.

10. Air speed measuring apparatus for a helicopter including means therein for providing an output signal representative of the helicopter attitude with respect to a reference plane comprising:

a pitot-static probe formed to be rotatably mounted to the external surface of the helicopter in the rotor downwash, said probe having a pitot port and a static port;

probe rotating means operatively connected to said probe for positioning said pitot port across the path of the air stream component which lies in a plane normal to the rotational axis of said probe; and computer means formed to receive the attitude signal and operatively connected to said probe for receiving the pressures at said pitot and static ports and the rotational position of said probe and including means responsive to said signal, pressures and position for providing an output signal indicative of the air speed of the helicopter.

11. Apparatus according to claim 10 wherein:

said probe further includes a pair of correction ports lying in planes equi-angularly displaced from the plane formed by the probe rotational axis and the pitot port; and said probe rotating means is operatively connected to said probe for receiving the pressures at said correction ports and for rotating said probe in a direction to eliminate unbalance in said pressures.

12. Apparatus according to claim 11 wherein said computer means includes:

pressure transducer means connected to said pitot and static ports of said probe for providing an output signal representative of the total velocity of the air stream within whose path said probe is positioned;

means operatively connected to said probe for providing an output signal indicative of the angular deviation of the position of said probe from the direction of the helicopter downwash component of the airstream; and means connected to said transducer means for receiving said velocity output signal thereof, connected to said position sensing means for receiving the angular deviation output signal thereof and formed to receive the attitude signal and, in response thereto for providing said output signal indicative of the air speed of the helicopter in the direction which lies along the intersection of the reference plane with said plane which is normal to the rotational axis of said probe.

References Cited

UNITED STATES PATENTS

| | | | |
|---|---|---|---|
| 2,512,278 | 6/1950 | Jones | 73—182 X |
| 2,661,624 | 12/1953 | Bechberger et al. | 73—180 |
| 2,846,878 | 8/1958 | Carbonare | 73—182 |
| 2,952,154 | 9/1960 | Traksel | 73—182 |
| 2,986,933 | 6/1961 | Summerlin et al. | 73—181 |
| 3,070,999 | 1/1963 | Garbell | 73—181 |
| 3,079,758 | 3/1963 | Vogel et al. | 73—180 X |
| 3,094,868 | 6/1963 | Andersen et al. | 73—182 X |
| 3,247,717 | 4/1966 | Remmer et al. | 73—178 X |

DAVID SCHONBERG, *Primary Examiner.*

LOUIS R. PRINCE, *Examiner.*

N. B. SIEGEL, *Assistant Examiner.*